United States Patent [19]

Rosenlund

[11] Patent Number: 5,180,029
[45] Date of Patent: Jan. 19, 1993

[54] ANTI-THEFT DEVICE

[76] Inventor: Johan Rosenlund, P.O. Box 16, 186 94 Vallentuna, Sweden

[21] Appl. No.: 768,291
[22] PCT Filed: Apr. 17, 1990
[86] PCT No.: PCT/SE90/00255
  § 371 Date: Oct. 10, 1991
  § 102(e) Date: Oct. 10, 1991
[87] PCT Pub. No.: WO90/13459
  PCT Pub. Date: Nov. 15, 1990

[30] Foreign Application Priority Data

May 8, 1989 [SE] Sweden .................. 8901619

[51] Int. Cl.⁵ .................................... B60R 25/02
[52] U.S. Cl. .................... 180/287; 70/186; 70/252
[58] Field of Search ............. 180/287, 271; 70/252, 70/186

[56] References Cited

U.S. PATENT DOCUMENTS 4,934,479  6/1990  Usina ................... 180/287
4,936,408  6/1990  Melo ................... 180/287

FOREIGN PATENT DOCUMENTS 0203850 12/1986 European Pat. Off. .
0210324  2/1987 European Pat. Off. .
0276565  8/1988 European Pat. Off. .
2823695  5/1979 Fed. Rep. of Germany .

Primary Examiner—Kenneth R. Rice
Attorney, Agent, or Firm—Keck, Mahin & Cate

[57] ABSTRACT

An anti-theft device intended primarily for automotive vehicles comprises a coupling including two interconnectable coupling-halves firmly attached to an outer end of a steering-wheel shaft and to the center of a steering wheel, respectively. One coupling half includes a plug and the other coupling half includes a sleeve which fits the plug. Locking plungers passing through the sleeve wall and spring biased radially inwardly are intended to be received in recesses in the plug. Each locking plunger and associated recess from a wedge assembly which strives to press an end surface of the sleeve towards a support surface projecting outwardly from the plug, while preventing movement of the sleeve in an opposite direction. A pressure spring device acts between the support surface and the end surface.

10 Claims, 1 Drawing Sheet

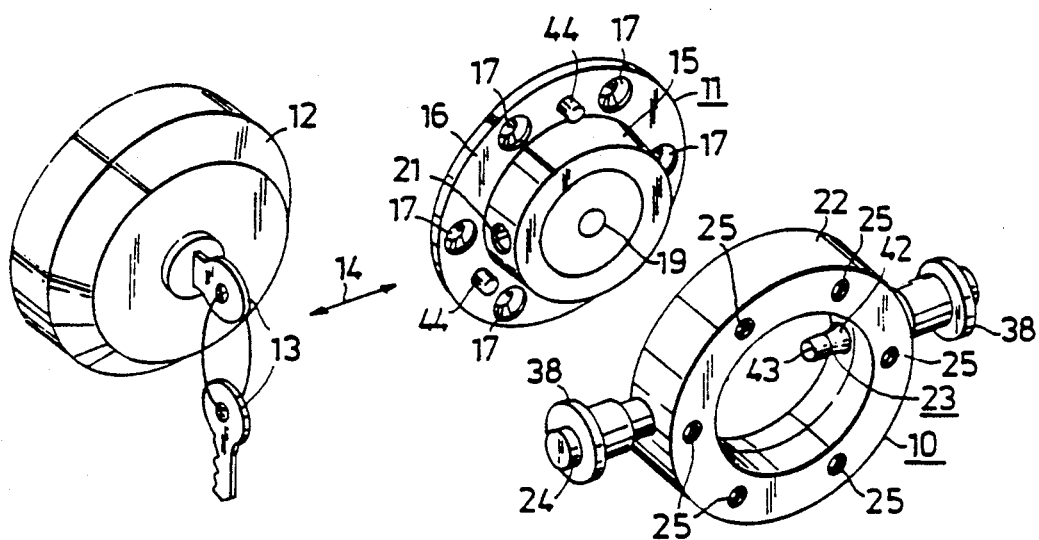
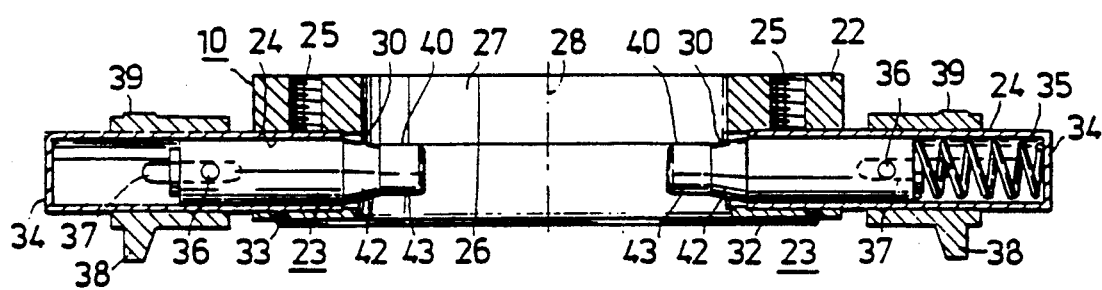
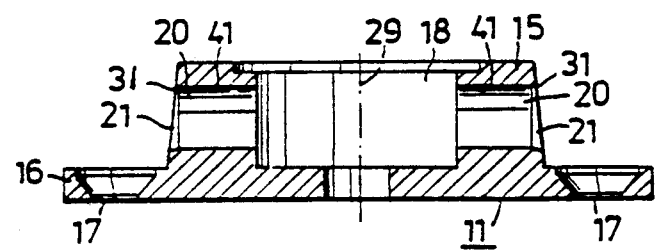

ANTI-THEFT DEVICE

The present invention relates to an anti-theft device in the form of a coupling which acts between a steering wheel and a steering-wheel shaft and which includes two coupling-halves which are rigidly connected to an outer end of the steering-wheel shaft and to the centre of the steering wheel respectively, and which further includes connecting means active between the coupling-halves and operative to connect the coupling-halves detachably together, wherein the one coupling-half has provided thereon a plug which widens towards one end thereof and a support surface located at said one end of the plug and projecting outward substantially in the transverse direction of said plug, whereas the other coupling-half includes a sleeve which fits the plug and which, in the mutually coupled state of said coupling-halves, receives the plug and in turn supported by said support surface, and wherein the connecting means comprises locking plungers which are spring-biased in a radially inward direction and which pass through the wall of said sleeve and are intended to be received in recesses provided in said plug. This arrangement enables the steering wheel and the coupling-half mounted thereon to be removed from the steering-wheel shaft with a simple handmanipulation and to be taken away, so as to render steering practically impossible.

The object of the present invention is to provide a novel and improved anti-shaft device of the aforedescribed kind in which the risk of play between the coupling-halves is eliminated.

To this end it is proposed in accordance with the invention that with an anti-theft device of the aforedescribed kind each locking plunger and associated recess in the plug are configured as a wedge assembly which, in the mutually coupled state of said coupling-halves, strives to press the sleeve in a direction towards said support surface while preventing movement of the sleeve in a direction away from said support surface, and wherein a pressure-spring device is active between said support surface and the end-surface of the sleeve facing said support surface. This arrangement ensures that the coupling-halves, and therewith the steering wheel and steering-wheel shaft are coupled together in the absence of any clearance or play between said coupling-halves. The pressure-spring device also greatly facilitates removal of the steering wheel, since subsequent to withdrawing the locking plungers from their respective recesses in the plug, the pressure-spring device is operative to move the coupling-halves initially apart.

Other characterizing features of the invention and further advantages afforded thereby will be evident from the depending claims and from the following description, which is made with reference to an exemplifying embodiment of the inventive anti-theft device illustrated in the accompanying drawings, in which:

FIG. 1 is a perspective view of the anti-theft device, the shown device also including a cover member which can be locked firmly to the plug; and FIG. 2 is an axial sectional view of the coupling-halves illustrated in FIG. 1.

The reference numerals 10 and 11 in FIGS. 1 and 2 identify generally two coupling-halves which are intended to detachably couple a steering wheel (not shown) of, e.g., an automotive vehicle to the steering-wheel shaft (not shown) in a manner which, with the aid of a simple hand-manipulation, will enable the steering wheel to be removed from the steering-wheel shaft and to be connected to the steering-wheel shaft such as to obtain no play therebetween and in an efficient and effective manner from a safety aspect. The anti-theft device illustrated in FIG. 1 also includes a lockable cover member 12, with keys 13, which can be securely locked to the coupling-half 11 when said coupling-half is not coupled to the coupling-half 10, in the manner indicated by the double-headed arrow 14.

The one coupling-half 11 comprises a plug 15 which widens conically towards one end thereof. Adjoining this one end of the plug is a plate or flange 16 which has holes 17 provided circumferentially therearound. In the illustrated embodiment, the flange 16 is intended to be secured firmly, with the aid of screws (now shown) passing through the holes 17, to an outer end of the steering-wheel shaft via an intermediate part, which is deformable when subjected to a powerful force, e.g. in the event of a collision. As will be seen from FIG. 2, the plug 15 is hollow and is intended to accommodate, e.g., a connection between a signal horn and a horn button located in the centre of the steering wheel. Part of such a connection is identified at 19 in FIG. 1. The plug 15 also includes recesses in the form of holes which extend diagonally through the plug 15, each of the holes being comprised of an inner cylindrical part 20 and an outer part 21 which widens conically outwards towards the outer surface of the plug 15.

The outer coupling-half 10 comprises a sleeve 22 and diametrically opposed locking plungers 23 which are displaceable in guides 24 extending through the sleeve wall and which are spring-biassed radially inwards. The sleeve 22 is provided on one end-surface thereof with a number of screwthreaded holes 25 which are intended to receive screws (not shown) which extend through the centre of the steering wheel and which are operative to connect the steering wheel coaxially with the sleeve 22. As illustrated in FIG. 2, the inside of the sleeve 22 can be provided with a conical part 26 which accurately fits the conical surface of the plug 15 adjacent the flange 16, and a cylindrical part 27. Alternatively, the inside of the sleeve can have a totally conical configuration. The reference numeral 28 identifies the symmetry axis of the coupling-half 10, this axis coinciding with the symmetry axis 29 of the coupling-half 11 when the two halves 10, 11 are coupled together.

Each of the locking plungers 23 is spring-biassed towards a radially inwards position and can be withdrawn, against the action of the spring force, to a position in which the radially inwards or forward end of the plunger is located radially outside the conical sleeve-surface 26. When the locking plungers occupy this latter position, the sleeve 22 can be fitted onto the plug 15, wherewith when the coupling-halves 10, 11 are rotated to a given mutual position, the locking plungers 23 will be pressed into the recesses 20, 21 in the plug 15, by the action of said spring force. Inclined parts 30 and 31 of the locking plungers 23 and of the outer parts 21 of the recesses respectively will then function as wedge surfaces which, together with the spring force acting on the locking plungers, will strive to press the sleeve 22 in a direction towards the flange 16, which forms a support surface for the end-surface 32 of said sleeve facing said flange, while preventing movement of the sleeve in a direction away from the support surface 16. The end-surface 32 of the sleeve is intended to to support against the support surface 16, via a pressure-spring device which subsequent to withdrawing the locking plungers 23 will initially distance the surface 32 from the surface 16, therewith on the first hand avoiding the occurrence of play and on the second hand avoiding mutual jamming of the aforesaid parts and facilitating separation of the coupling-halves 10, 11 one from the other. In the case of the illustrated embodiment, the pressure-spring device comprises a ring-shaped pressure-spring 33 in the form of an O-ring made of elastomeric material and received in a circular groove provided in the end-surface 32 of said sleeve concentrically with the symmetry axis 28. The groove accomodating the spring 33, however, may alternatively be provided in the side of the flange 16 facing towards the surface 32, as will readily be understood.

The locking plungers 23 of the illustrated embodiment have a circular cross-section and are accomodated in cylindrical guides 24 which are open at their inwardly located ends and at their outwardly located ends are closed by means of end walls 34. Each locking plunger 23 is spring-biassed by a pressure spring 35 (only one spring 35 is shown), which is active between the rear plunger end and an associated end wall 34. Movement of respective locking plungers 23 in the guide is restricted by an arrangement consisting of a pin 36, which extends diametrically through locking plunger 23 and elongated slots 37 extending longitudinally in the guide cylinder 24. The pins 36 also engage in clolars 38 which are displaceably journalled on the outside of the guide cylinders 24 and by means of which the locking plungers 23 can be readily moved manually outwards to disengaging positions. As shown at 39 in FIG. 2, parts of the collars 38 can be removed, for instance when there is insufficient space between the collars and the undersurface of the steering wheel.

In order to prevent the coupling-halves 10,11 from being moved apart unintentionally when subjected to extreme load, each locking plunger 23 has adjacent its forward end a surface 40 which forms a right angle, or substantially a right angle with a plane which contains the symmetry axis 28 of said sleeve and which extends perpendicularly to the longitudinal axis of the locking plungers 23. This surface 40 is intended to coact with a surface 41 facing towards the base of the plug 15 within the recess cooperating with the locking plunger concerned. The surfaces 40 and 41 on the locking plunger 23 and in the recess 20,21 of the sleeve 10 respectively are thus located radially inwards of the aforedescribed wedge surfaces 30 and 31 respectively. As beforementioned, the locking plungers 23 advantageously have a circular cross-section, wherein locking plunger parts 42 which taper conically towards the symmetry axis 28 of said sleeve from the wedge surfaces 30 for coaction with the wedge surface 31 of the recesses 20, 21. Adjoining the narrower ends of the conically tapering locking-plunger parts 42 are substantially cylindrical parts 43 which form the forward end of respective locking plungers 23. These cylindrical parts 43 have a smaller diameter than the inner parts 20 of the recesses 20,21 and present the above-mentioned surfaces 40.

The invention is not restricted to the described and illustrated embodiment, but can be realized in any desired manner within the scope of the invention concept defined in the claims. The inventive device can also be combined with other anti-theft devices. One such embodiment is illustrated in FIG. 1, in which can be seen a number of pins 44 upstanding from the flange 16 in the same direction as the plug 15 which are intended to be received in corresponding (not shown) holes in the sleeve surface 32. The positioning of these pins 44 and associated holes may be unique to the coupling concerned, such as to prevent a coupling-half of one coupling to be coupled to a coupling-half of another coupling.

I claim:

1. An anti-theft device in the form of a coupling which acts between a steering wheel and a steering-wheel shaft and which includes two coupling-halves (10,11) which are rigidly connected to an outer end of the steering-wheel shaft and to the centre of the steering wheel respectively, and which further includes connecting means (23,35) active between said coupling-halves and operative to connect the said coupling-halves detachably together, wherein the one coupling-half (11) has provided thereon a plug (15) which widens towards one end thereof and a support surface (16) located at said one end of the plug and projecting outwards substantially in the transverse direction of said plug, whereas the other coupling-half (10) includes a sleeve (22) which fits the plug (15) and which, in the mutually coupled state of said coupling-halves, receives the plug and in turn is supported by said support surface (16), and wherein the connecting means (23,35) comprise locking plungers (23) which are spring-biassed in a radially inward direction and which pass through the wall of said sleeve and are intended to be received in recesses (20,21) provided in said plug (15), characterized in that each locking plunger (23) and associated recess (20,21) in the plug are configured as a wedge assembly which, in the mutually coupled state of said coupling-halves (10, 11), strives to press the sleeve (22) in a direction towards said support surface (16) while preventing movement of the sleeve in a direction away from the support surface and wherein a pressure-spring device (33) is active between said support surface (16) and the end-surface (32) of the sleeve facing said support surface.

2. An anti-theft device according to claim 1, characterized in that the pressure-spring device (33) is a ring-shaped pressure spring which is mounted in a retaining groove provided in either said support surface (16) or the end-surface (32) of the sleeve facing said support surface.

3. An anti-theft device according to claim 2, characterized in that the ring-shaped pressure spring (33) is an O-ring made of an elastomeric material.

4. An anti-theft device according to claim 1, characterized in that each locking surface (23) has provided adjacent its forward end a surface (40) which forms at least substantially a right angle with a plane which contains the axis (28) of the sleeve (10) and which extends perpendicularly to the longitudinal axis of the locking plunger and, for the purpose of preventing movement of the sleeve away from said support surface (16), is intended to coact with a surface (41) located within the recess (20,21) for the locking plunger concerned and facing towards the base of said plug (15), and a wedge surface (30) located behind said surface (40) and forming an acute angle with said plane, said wedge surface (30) being intended to coact with a corresponding wedge surface (31) at the outer part of said recess such as to press the sleeve against the support surface (16).

5. An anti-theft device according to claim 1, characterized in that the locking plungers (23) have a substantially circular cross-sectional shape, and in that locking-plunger parts (42) which taper conically towards the sleeve axis (28) form wedge surfaces (30) for coaction with corresponding defining surfaces (31) of the recesses (20,21) in the plug (15) facing towards the support surface (16).

6. An anti-theft device according to claim 4, characterized in that the narrower ends of the conically tapering locking-plunger parts (42) adjoin with substantially cylindrical parts (43) which form the forward end of respective locking plungers (23).

7. An anti-theft device according to claim 1, characterized in that the ends of the locking plungers (23) extending radially outwards of the sleeve (22) carry collars (39) for facilitating manual disengagement of the coupling-halves (10,11), one from the other, by withdrawal of the locking plungers from respective recesses (20, 21) in the plug (15).

8. An anti-theft device according to claim 7, characterized in that the locking plungers (23) are guided for longitudinal movement in guide cylinders (24) which project radially outwards from the sleeve and on the other surface of which the collars (38) are mounted displaceably, the collars being connected with respective locking plungers (23) by means of pins (36) which pass through elongated slots (37) extending longitudinally in said guide cylinders (24).

9. An anti-theft device according to claim 1, characterized in that said device also includes a cover member (12) which can be locked to the coupling-half (11) fitted to the steering-wheel shaft, subsequent to removing the steering wheel and the coupling-half (10) fixedly attached thereto from said shaft.

10. An anti-theft device according to claim 1, characterized in that the sleeve (22) is firmly attached to the steering wheel.

* * * * *